United States Patent
Komatsu et al.

(10) Patent No.: US 7,662,736 B2
(45) Date of Patent: *Feb. 16, 2010

(54) HIGH THERMALLY CONDUCTIVE ALUMINUM NITRIDE SINTERED PRODUCT

(75) Inventors: Michiyasu Komatsu, Yokohama (JP); Kimiya Miyashita, Fujisawa (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/272,468

(22) Filed: Nov. 17, 2008

(65) Prior Publication Data

US 2009/0075071 A1    Mar. 19, 2009

Related U.S. Application Data

(63) Continuation of application No. 10/579,916, filed as application No. PCT/JP2004/017531 on Nov. 18, 2004, now Pat. No. 7,479,467.

(30) Foreign Application Priority Data

Nov. 21, 2003  (JP)  ............................. 2003-392464

(51) Int. Cl.
     *C04B 35/581* (2006.01)
(52) U.S. Cl. .................................. 501/98.4
(58) Field of Classification Search ......... 501/98.4
     See application file for complete search history.

(56) References Cited

U.S. PATENT DOCUMENTS

| | | | |
|---|---|---|---|
| 5,314,850 A | 5/1994 | Miyahara | |
| 5,320,990 A | 6/1994 | Guiton et al. | |
| 5,744,411 A | 4/1998 | Zhao et al. | |
| 5,773,377 A | 6/1998 | Harris et al. | |
| 5,874,278 A | 2/1999 | Sloma et al. | |
| 6,403,510 B1 | 6/2002 | Kuibira et al. | |
| 6,800,576 B2 | 10/2004 | Katsuda et al. | |
| 7,288,496 B2 | 10/2007 | Kobayashi et al | |
| 7,479,467 B2 * | 1/2009 | Komatsu et al. | ........... 501/98.4 |

FOREIGN PATENT DOCUMENTS

| | | |
|---|---|---|
| JP | 4-42862 | 2/1992 |
| JP | 4-27184 | 5/1992 |
| JP | 5-105525 | 4/1993 |
| JP | 5-238830 | 9/1993 |
| JP | 8-508461 | 9/1996 |
| JP | 2000-178072 | 6/2000 |
| JP | 2001-97779 | 4/2001 |
| WO | WO9422787 | 10/1994 |

* cited by examiner

*Primary Examiner*—Karl E Group
(74) *Attorney, Agent, or Firm*—Oblon, Spivak, McClelland, Maier & Neustadt, L.L.P.

(57) ABSTRACT

The high thermal conductive aluminum nitride sintered body according to the present invention has: a thermal conductivity of 220 W/m·K or more; and a three point bending strength of 250 MPa or more; wherein a ratio ($I_{Al_2Y_4O_9}/I_{AlN}$) of X-ray diffraction intensity ($I_{Al_2Y_4O_9}$) of $Al_2Y_4O_9$ (201 plane) with respect to X-ray diffraction intensity ($I_{AlN}$) of aluminum nitride (101 plane) is 0.002 to 0.03. According to the foregoing structure, there can be provided an aluminum nitride sintered body having a high thermal conductivity and excellent heat radiating property.

18 Claims, No Drawings

HIGH THERMALLY CONDUCTIVE ALUMINUM NITRIDE SINTERED PRODUCT

CROSS REFERENCE TO RELATED APPLICATION

This application is a continuation of allowed U.S. application Ser. No. 10/579,916 (now U.S. Pat. No. 7,479,467), which is a 371 of PCT/JP04/017531, filed on Nov. 18, 2004, and claims priority to Japanese Patent Application No. 2003-392464, filed on Nov. 21, 2003.

TECHNICAL FIELD

The present invention relates to a high thermal conductive aluminum nitride sintered body, and more particularly to an aluminum nitride sintered body having a high thermal conductivity and is excellent in heat radiating property and mass-productivity.

BACKGROUND ART

A ceramic sintered body having a variety of excellent characteristics, such as strength, heat resistance, corrosion resistance, wear resistance and lightweight and the like, as compared with the conventional metal materials has been widely used in a mechanical part, functional part, structural material and decorative material for forming a semiconductor board, electronic equipment material, engine part, material for a high-speed cutting tool, nozzle, bearing or the like that is used in severe temperature, stress and wear conditions under which conventional metal materials cannot be used satisfactorily.

Particularly, since an aluminum nitride (AlN) sintered body is an insulating body having excellent thermal conductivity and a thermal expansion coefficient near that of silicon (Si), it has been further widely used as a heat radiation plate or a substrate of a highly-integrated semiconductor apparatus.

The above conventional aluminum nitride sintered body has been usually mass-produced in accordance with the following manufacturing method. That is, a sintering agent such as $Y_2O_3$ or the like, an organic binder and, if necessary, any of various additives, a solvent and a dispersant are added to a raw material powder of aluminum nitride thereby to prepare a material powder mixture. The obtained raw material powder mixture is molded into a thin-plate shape or sheet-shape molded body by a doctor blade method or a slip casting method, or the raw material powder mixture is press-molded into a thick-plate or a large-size molded body. Then, the thus obtained molded body is heated to a temperature of 400-500° C. in the air or nitrogen atmosphere, and is dewaxed so that carbon hydride component and the like used as the organic binder is removed from the molded body and is almost completely dewaxed. The dewaxed molded body is heated to high temperature in nitrogen atmosphere or the like so as to be densified and sintered so that an aluminum nitride sintered body is formed.

Aluminum nitride is a sinter-resisting ceramic. In order to promote a densification of the ceramic and to prevent the thermal resistance of the ceramic from increasing by solid-dissolving impurity oxygen contained in AlN material powder into the AlN crystal grains, there has been generally adopted a method in which rare earth oxide such as yttrium oxide ($Y_2O_3$) or the like is used as the sintering agent. These sintering agents react with oxygen contained in AlN material powder. In case of $Y_2O_3$, there is formed a liquid phase composition composed of $3Y_2O_3 \cdot 5Al_2O_3$ (YAG), $Y_2O_3 \cdot Al_2O_3$ (YAL), $2Y_2O_3 \cdot Al_2O_3$ (YAM) or the like, thereby to achieve the densification of the sintered body. In addition, the impurity oxygen acting to increase the thermal conductivity can be fixed as grain boundary phase, so that the high thermal conductivity of the sintered body can be achieved.

As an example of such conventional high thermal aluminum nitride sintered body, Japanese Patent Application (Laid Open) No. 10-25160 has proposed an aluminum nitride sintered body comprising: main phase composed of aluminum nitride of which an average grain size of aluminum nitride crystal grains is 2-10 μm; and secondary phase composed of a single component of $2Y_2O_3 \cdot Al_2O_3$, $Y_2O_3 \cdot Al_2O_3$ or $3Y_2O_3 \cdot 5Al_2O_3$ and having a $Y_2O_3$ content of 1.0-4.6 wt %; wherein the aluminum nitride sintered body has a thermal conductivity of 200 W/mK or more, and a bending strength of 40 Kg/mm² or more.

In the above conventional manufacturing method, however, even in a case where an average grain size of the material powder, kinds and addition amounts of impurity and sintering assistant agent, conditions of the degreasing treatment and sintering operation or the like were strictly controlled, it was difficult to obtain a AlN sintered body having a high thermal conductivity of 220 W/m·K or more. Namely, since a large amount of rare earth oxide to be 3-5 mass. % required for fixing the aforementioned impurity oxygen is added to the AlN material powder, an amount of oxide acting as thermal resistance is increased in a structure of the sintered body, so that it is difficult to obtain a AlN sintered body having a high thermal conductivity of 220 W/m·K or more. Accordingly, there are many cases where an excellent heat radiating property which is the most characterizing property inherent to AlN sintered body is disadvantageously impaired, so that a technical improvement has been eagerly demanded.

The present invention has been achieved for solving the foregoing problems and therefore an object of the present invention is to provide a high thermal conductive aluminum nitride sintered body having a high thermal conductivity and is excellent in heat radiating property.

DISCLOSURE OF INVENTION

In order to achieve the foregoing objects, the inventors of the present invention reviewed and changed type and quantity of addition of a sintering agent and additives to be added to the aluminum nitride raw material powder, the method of reducing oxygen which is a factor of inhibiting the heat conduction, the degreased state of the molded body, and comparatively investigated the influence of the changes upon the densification or structure and thermal conductivity of the sintered body.

As a result, the inventors have obtained the following findings. Namely, when the amount of $Y_2O_3$ as the sintering agent is set to a minimum amount of 0.2-2 mass % required for the densification, and a suitable amount of carbon (C), required for removing the oxygen acting as factor of inhibiting thermal conductivity, is remained by controlling the conditions of the degreasing step, or when a calcining treatment step is introduced into the sintering step prior to densification step, or when the grain boundary phase after the sintering operation is formed of two kinds of phases: i.e., i) phase composed of only $2Y_2O_3 \cdot Al_2O_3$ (YAM); and ii) phase composed of $2Y_2O_3 \cdot Al_2O_3$ (YAM) and $Y_2O_3$, the impurity oxygen content in the sintered body is reduced to be 0.5% or less, so that it becomes possible to obtain an aluminum nitride sintered body having a high thermal conductivity of 220 W/mK or higher, preferably, 250 W/mK or higher with a good mass-productivity.

Further, when the sintered body after completion of the densification sintering step is moderately cooled at a cooling rate of 150° C./hr or lower, a coarse grain boundary phase is not generated, so that AlN sintered body having dense and fine crystal structure can be obtained. The present invention had been achieved on the basis of the above findings.

That is, a high thermal conductive aluminum nitride sintered body according to a first invention is characterized in that the high thermal conductive aluminum nitride sintered body has: a thermal conductivity of 220 W/m·K or more; and a three point bending strength of 250 MPa or more; wherein a ratio ($I_{Al_2Y_4O_9}/I_{AlN}$) of X-ray diffraction intensity ($I_{Al_2Y_4O_9}$) of $Al_2Y_4O_9$ (201 plane) with respect to X-ray diffraction intensity ($I_{AlN}$) of aluminum nitride (101 plane) is 0.002 to 0.03.

Further, in the above high thermal conductive aluminum nitride sintered body according to the first invention, the aluminum nitride sintered body can be also constituted such that a ratio ($I_{Y_2O_3}/I_{AlN}$) of X-ray diffraction intensity ($I_{Y_2O_3}$) of $Y_2O_3$ (222 plane) with respect to X-ray diffraction intensity ($I_{AlN}$) of AlN (101 plane) is 0.002 to 0.06.

Furthermore, in the above high thermal conductive aluminum nitride sintered body according to the first invention, the aluminum nitride sintered body can be preferably constituted such that the high thermal conductive aluminum nitride sintered body contains 0.14-1.5 mass % of Y element and 0.05-0.5 mass % of oxygen, a mass ratio (O/Y) of oxygen (O) with respect to Y element is 0.5 or less, an average diameter of aluminum nitride crystal grains is 4 μm or more, a number of crystal grains existing in arbitrary crystal structure area of 100 μm×100 μm is 200 or less, a maximum diameter of grain boundary phase is 0.5 μm or less. Further, in the above first invention, it is preferable that a minimum diameter of the aluminum nitride crystal grains is 2 μm or more, and a maximum diameter of the aluminum nitride crystal grains is 20 μm or less.

Further, a high thermal conductive aluminum nitride sintered body according to a second invention is characterized in that the high thermal conductive aluminum nitride sintered body has a thermal conductivity of 200 W/m·K or more; and a three point bending strength of 250 MPa or more; wherein a ratio ($I_{Al_2Y_4O_9}/I_{AlN}$) of X-ray diffraction intensity ($I_{Al_2Y_4O_9}$) of $Al_2Y_4O_9$ (201 plane) with respect to X-ray diffraction intensity ($I_{AlN}$) of AlN (101 plane) is 0.002 to 0.06, and a ratio ($I_{Y_2O_3}/I_{AlN}$) of X-ray diffraction intensity ($I_{Y_2O_3}$) of $Y_2O_3$ (222 plane) with respect to X-ray diffraction intensity ($I_{AlN}$) of AlN (101 plane) is 0.008 to 0.06.

Furthermore, in the above high thermal conductive aluminum nitride sintered body according to the second invention, the aluminum nitride sintered body can be also preferably constituted such that the high thermal conductive aluminum nitride sintered body contains 0.14-1.5 mass % of Y element and 0.05-0.5 mass % of oxygen, a mass ratio (O/Y) of oxygen (O) with respect to Y element is 0.6 or less, an average diameter of aluminum nitride crystal grains is 6 μm or more, a number of crystal grains existing in arbitrary crystal structure area of 100 μm×100 μm is 150 or less, a maximum diameter of grain boundary phase is 0.5 μm or less. Further, in the above second invention, it is preferable that a minimum diameter of the aluminum nitride crystal grains is 4 μm or more, and a maximum diameter of the aluminum nitride crystal grains is 25 μm or less.

In the above high thermal conductive aluminum nitride sintered body according to the first and second inventions, a main phase constituting the sintered body is composed of aluminum nitride (AlN), while a grain boundary phase to be a secondary phase is limited to either a phase composed $2Y_2O_3 \cdot Al_2O_3$ (YAM) having a low heat resistance or a phase composed of $2Y_2O_3 \cdot Al_2O_3$ (YAM) and $Y_2O_3$. The above YAM phase is identified and quantified as a diffraction peak intensity of $Al_2Y_4O_9$ (201 plane) by an X-ray diffraction analysis. In a case where the grain boundary phase contains a third phase such as $Y_2O_3 \cdot Al_2O_3$ (YAL), $3Y_2O_3 \cdot 5Al_2O_3$ (YAG) or the like having a high heat resistance, the thermal conductivity of the AlN sintered body is disadvantageously lowered.

In the above high thermal conductive aluminum nitride sintered body according to the first and second inventions, the X-ray diffraction intensity ratio ($I_{Al_2Y_4O_9}/I_{AlN}$) indicates a generation ratio of above YAM phase, and the intensity ratio is set to a range of 0.002 to 0.03 or a range of 0.002 to 0.06 so as to meet technical demands of the thermal conductivity and three-point bending strength of the sintered body. When the X-ray diffraction intensity ratio of the above YAM phase is less than the lower limit of the ranges, a function of the grain boundary phase for mutually bonding the AlN crystal grains becomes insufficient, so that there may be a case where a structural strength of the sintered body is disadvantageously lowered. On the other hand, when the X-ray diffraction intensity ratio exceeds the above upper limit of the ranges, heat resistance is increased and the thermal conductivity of the sintered body is liable to lower.

The ratio ($I_{Y_2O_3}/I_{AlN}$) of X-ray diffraction intensity ($I_{Y_2O_3}$) of $Y_2O_3$ (222 plane) with respect to X-ray diffraction intensity ($I_{AlN}$) of AlN (101 plane) indicates a generation ratio of $Y_2O_3$ phase precipitated in the grain boundary, and the intensity ratio is set to a range of 0.002 to 0.06 or a range of 0.008 to 0.06 so as to meet technical demands of the thermal conductivity and three-point bending strength of the sintered body. When the above X-ray diffraction intensity ratio of the $Y_2O_3$ phase is less than the lower limit of the ranges, the effect of improving the sintering property is insufficient, so that structural strength of the sintered body is disadvantageously lowered. Further, oxygen solid-solutes into in the AlN crystal grains thereby to lower the thermal conductivity. On the other hand, when the X-ray diffraction intensity ratio exceeds the above upper limit (0.06) of the ranges, pores are remained in sintered body, and a degree of contraction of the sintered body is increased, so that a deformation of the sintered body is increased and the thermal conductivity is also lowered.

In a case where the X-ray diffraction intensity ratio ($I_{Al_2Y_4O_9}/I_{AlN}$) is set to a range of 0.002 to 0.03, or in a case where the X-ray diffraction intensity ratio ($I_{Al_2Y_4O_9}/I_{AlN}$) is set to a range of 0.002 to 0.06 and the X-ray diffraction intensity ratio ($I_{Y_2O_3}/I_{AlN}$) is set to a range of 0.002 to 0.06, it is easy to obtain an aluminum nitride sintered body having a thermal conductivity of 220 W/m·K or more and a three-point bending strength of 250 MPa or more.

Further, in a case where the X-ray diffraction intensity ratio ($I_{Al_2Y_4O_9}/I_{AlN}$) is set to a range of 0.002 to 0.06 and the X-ray diffraction intensity ratio ($I_{Y_2O_3}/I_{AlN}$) is set to a range of 0.008 to 0.06, it is easy to obtain an aluminum nitride sintered body having a thermal conductivity of 240 W/m·K or more and a three-point bending strength of 200 MPa or more.

Y element reacts with impurity oxygen contained in AlN raw material powder thereby to generate a liquid phase composed of yttria-alumina-metal compound (YAM, $2Y_2O_3 \cdot Al_2O_3$) or the like, and Y element has a function as sintering promoter for achieving a densification of the sintered body. In addition, Y element fixes the impurity oxygen as the grain boundary phase thereby to achieve the high thermal conduction. For realizing this function, Y element is added at an amount of 0.2 to 2 mass % in terms of oxide thereof.

In a case where the amount of Y element in terms of oxide thereof less than 0.2 mass %, the effect of improving the sintering property cannot be sufficiently exhibited. Therefore, the sintered body is not sufficiently densified and a sintered body having a low strength is liable to be made, or the oxygen is dissolved and solid-soluted into the AlN crystal grains, so that a sintered body having a high thermal conductivity cannot be formed.

On the other hand, when the content exceeds 2 mass %, an excess amount of grain boundary phases are remained in the sintered body. In addition, since a volume of grain boundary phase to be removed by a heat treatment becomes large, voids (pores) are easily remained in the sintered body, so that the degree of the contraction of the sintered body is increased, the sintered body is easily deformed, and the thermal conductivity of the sintered body is lowered. Finally, the amount of Y element to be contained in the AlN sintered body is preferably set to a range of 0.14 to 1.5 mass %.

On the other hand, the oxygen (O) is a component for forming the above grain boundary phase, and it is preferable to contain the oxygen at an amount of 0.05 to 0.5 mass % in the AlN sintered body. When the oxygen content is less than 0.05 mass %, the generation ratio of the grain boundary phase is small, the effect of the grain boundary for firmly bonding the AlN crystal grains, so that a structural strength of the whole AlN sintered body is disadvantageously lowered. That is, the above liquid phase composed of Y component and oxygen are solidified as glassy structure or crystalline structure after completion of the sintering operation, thereby to form grain boundary phases. These grain boundary phases would firmly bond the AlN crystal grains mutually, thereby to enhance the structural strength of the whole AlN sintered body.

However, when the oxygen content becomes large so as to exceed 0.5 mass %, a ratio of the grain boundary phase having a high heat resistance is relatively increased, so that the thermal conductivity of the sintered body is decreased. In addition, an excessive amount of grain boundary phase is remained in the sintered body and a volume of grain boundary phase to be removed by a heat treatment becomes large, voids (pores) are easily remained in the sintered body, so that pores (voids) are remained in the sintered body and the degree of the contraction of the sintered body is increased, the sintered body is easily deformed.

Further, in the high thermal conductive aluminum nitride sintered body according to the present invention, it is preferable that the weight ratio (O/Y) of oxygen with respect to Y element is set to 0.5 or less. When this weight ratio (O/Y) becomes large so as to exceed 0.5, an oxygen compound having a high heat resistance is increased thereby to lower the thermal conductivity of the sintered body. The weight ratio (O/Y) is more preferably set to 0.4 or less.

Furthermore, in the high thermal conductive aluminum nitride sintered body according to the present invention, it is preferable that an average grain size of AlN crystal grains is set to 4 μm or more, preferably to 6 μm or more. 8 μm or more is more preferable. This is because when AlN crystal grains are coarsened due to grain growth of AlN crystals, it becomes possible to reduce a number of grain boundary phases having a high heat resistance, so that the thermal conductivity of the sintered body can be increased.

Particularly, when the average grain size (diameter) of aluminum nitride crystal grains is set to 4 μm or more, preferably 6 μm or more, while the minimum grain size is set to 2 μm or more, and the maximum size is set to 20 μm or less, the number of the crystal grains existing in arbitrary crystalline structure area of 100 μm×100 μm is set to 200 or less, the maximum size of the grain boundary phase is set to 0.5 μm or less, it becomes possible to easily obtain a high thermal conductive aluminum nitride sintered body having a thermal conductivity of 220 W/m·K or more and a three-point bending strength of 250 MPa or more.

On the other hand, when the average grain size (diameter) of aluminum nitride crystal grains is set to 6 μm or more, preferably 8 μm or more, while the minimum grain size is set to 4 μm or more, and the maximum size is set to 25 μm or less, the number of the crystal grains existing in arbitrary crystalline structure area of 100 μm×100 μm is set to 150 or less, the maximum size of the grain boundary phase is set to 0.5 μm or less, it becomes possible to easily obtain a high thermal conductive aluminum nitride sintered body having a thermal conductivity of 240 W/m·K or more and a three-point bending strength of 200 MPa or more.

When the above average grain size or the minimum size of the aluminum nitride crystal grains is less than the above lower limit, the number of grain boundary phases that become heat resistance is increased thereby to easily lower the thermal conductivity. On the other hand, when the above maximum size of the aluminum nitride crystal grains exceeds the above upper limit, the structural strength of the sintered body is lowered, although the thermal conductivity is increased. Further, when the number of the aluminum nitride crystal grains existing in predetermined area exceeds the above upper limit, the number of grain boundary phases that become heat resistance is increased thereby to lower the thermal conductivity of the sintered body, although the structural strength is increased.

In this regard, the average grain size, the minimum size or the maximum size of the above aluminum nitride crystal grains and the maximum size of the grain boundary phase can be measured in accordance with the following steps. That is, a test sample having a dimension of 5 mm×10 mm×0.6 mm or 4 mm×4 mm×10 mm is cut out from the respective AlN sintered bodies. Then, three measuring areas each having an area of 100 μm×100 μm are selected on a cross-sectional structure of the respective test samples. Each measuring area is observed by means of SEM (scanning type electron microscope) at a magnification of 1000 thereby to take a structure image. The average grain size or the like are measured from the structure image. By the way, an object to be measured is limited to grains of which whole feature is revealed in the measuring area or the grain boundary phase in which whole of a triple-point is revealed in the measuring area.

Concretely, the diameter of the respective aluminum nitride crystal grains is measured as a diameter of a minimum circle circumscribing the AlN crystal grain, while the diameter of the grain boundary phase is measured as a diameter of a maximum circle inscribing the triple-point or the like of the grain boundary phase existing in the cross-sectional structure of AlN sintered body.

The minimum size of the aluminum nitride crystal grains in the present invention is a minimum value among the diameters of the AlN crystal grains existing in the above three areas. On the other hand, the maximum size of the aluminum nitride crystal grains is a maximum value among the diameters of the AlN crystal grains existing in the above three areas. Further, the average grain size of the aluminum nitride crystal grains is an average value of the diameters of whole AlN crystal grains existing in the above three measuring areas.

When the maximum size of the above grain boundary phase exceeds 0.5 μm such that aggregation and segregation of the liquid phase are remarkable, a function of the liquid phase for mutually bonding AlN crystal grains is lowered, so that the strength of whole sintered body is liable to be lowered. Simultaneously, the coarse grain boundary phase obstructs the heat conduction, so that the thermal conductivity of the AlN sintered body is disadvantageously lowered.

As a method of manufacturing the aluminum nitride sintered body according to the present invention, the following method can be adopted. For example, the method comprises the steps of: forming a material powder mixture by adding 0.2-2% by mass of Y element in terms of the amount of an oxide thereof and an organic binder, to aluminum nitride raw material powder having an oxygen content of 1 mass % or less and an average grain size of 1.5 µm or less; molding the material powder mixture to prepare a molded body (molded compact); degreasing the molded body so as to control a content of carbon remained in the molded body to a range of 0.3 to 0.6 mass %; conducting a calcinating treatment (provisional sintering) for calcinating the degreased molded body in non-oxidizing atmosphere; and conducting a main sintering treatment (final sintering) for sintering the calcined body.

Particularly in the above manufacturing method, when the sintered body is moderately cooled by controlling a cooling rate to 150° C./hour or lower until the sintering temperature is lowered to a temperature at which liquid phase formed at the sintering operation from the oxide of Y element is solidified, the pores can be made fine, and the crystalline structure of the aluminum nitride can be formed to be fine and uniform.

The aluminum nitride (AlN) raw material powder to be used in the method according to the present invention and serving as the main component of the sintered body is fine AlN raw material powder having an average grain size of 0.05 to 1.5 µm, preferably of up to 1 µm, to improve the sintering characteristics and thermal conductivity by restricting the content of impure oxygen to up to 1% by mass, preferably of up to 0.7% by mass.

When the average grain size aluminum nitride (AlN) powder to be used exceeds 1.5 µm, the sintering property is deteriorated, so that the sintering operation is required for a long time at a high temperature, and the mechanical strength of the sintered body is decreased, thus being unfavorable indeed.

An organic binder (binding agent) to be applicable to the present invention is not particularly limited. An organic polymer type binding agents such as polyvinyl butyral, poly methyl methacrylate or the like, that have been generally used for molding the ceramic powders, are preferably used.

As mentioned hereinbefore, the oxide of Y element as a sintering agent to density or fine the AlN sintered body and is added to the aluminum nitride raw material powder in an amount within a range of 0.2-2 mass % in terms of oxide thereof. As a concrete example of the sintering agent, the oxide of Y or a substance such as carbonate or the like that are changed into the oxide compound by the sintering operation are used. Y oxide or the compound is solely used, or used as a mixture of at least two compounds. Among the compounds, yttrium oxide ($Y_2O_3$) is particularly preferable.

These sintering agents react with aluminum oxide phase located on a surface of the aluminum nitride material powder thereby to form a liquid phase composed of composite oxide such as YAM or the like. This liquid phase contributes to highly densify the sintered body. In a case where $Y_2O_3$ is used as the sintering agent, it is considered that yttrium aluminate is generated and the liquid phase sintering is effectively advanced. When these sintering agents are added to the material powder and the sintering operation under a normal pressure is carried out, not only the sintering property is improved, but also the thermal conductivity of the sintered body can be improved. That is, the impurity oxygen having been dissolved in AlN during the sintering operation reacts with $Y_2O_3$, and is segregated in grain boundary phase as an oxide phase, so that there can be obtained a sintered body having less lattice defects, and thermal conductivity of the sintered body is advantageously improved.

Next, an outline of processes for manufacturing the above aluminum nitride sintered body will be explained hereunder. That is, a predetermined amount of Y compound as the selected sintering agent, organic binder, if necessary, required additives such as amorphous carbon or the like are added to the AlN raw material powder, thereby to prepare a material powder mixture. Then, the resultant mixture of the material powders is molded to prepare a molded body having a prescribed shape.

As the above method of molding the material powder mixture, any of the following methods may be employed: a general press-molding method, cold isostatic pressing (CIP) method, sheet molding method such as doctor blade method or roll molding method.

After the completion of the foregoing molding operation, the molded body is heated to a temperature of 500 to 800° C. for one to four hours in a non-oxidizing atmosphere, for example, nitrogen gas atmosphere so as to sufficiently degrease (dewax) and remove a great part of the organic binder added previously, so that a carbon content remained in the molded body is strictly controlled and adjusted.

Subsequently, the molded body subjected to the degreasing treatment is then subjected to a calcinating treatment in which the degreased molded bodies are heated up to a temperature of from 1,300 to 1,550° C. in a non-oxidizing atmosphere such as nitrogen ($N_2$) gas atmosphere or a reduced-pressure atmosphere, and then the molded bodies are held in the heated state for one to eight hours.

Due to a function of this calcinating treatment, the carbon remained in the molded body and oxygen component are effectively bonded to each other, and the bonded carbon-oxygen component is evaporated and removed from the molded body. As a result, the oxygen content of the molded body is reduced while a minimum amount of oxygen for forming grain boundary phase required for the densification of the sintered body is left in the molded body.

In a case where the above calcinating treatment is not performed, since the residual carbon effectively acting as the deoxidizing agent would not bond to oxygen and the oxygen is not evaporated or removed, the added $Y_2O_3$ is reduced by carbon and nitrided to generate YN or the carbon is remained as it is, so that the densification of the sintered body is inhibited.

After completion of the above degreasing treatment, i.e., at a stage prior to the main (final) sintering operation, it is important to control the carbon content remained in the molded body to within a range of 0.3-0.6 mass %.

In this regard, the carbon content remained in the molded body subjected to degreasing treatment is measured by utilizing a carbon analyzing device (EMIA-521. manufactured by Horiba Machinery).

When the carbon content remained in the molded body is less than 0.3 mass %, since the amount of carbon to be evaporated and eliminated by being bonded to oxygen is smaller than an optimum amount, the oxygen content in the sintered body is increased at the sintering process as a post process, so that the thermal conductivity of the sintered body is disadvantageously decreased. On the other hand, when the above residual carbon content remained in the molded body becomes large so as to exceed 0.6 mass %, the carbon is remained as it is even in the sintering operation, so that the densification of the sintered body is inhibited.

The molded body subjected to the calcinating treatment is accommodated in a sintering vessel, and then a plurality of the sintering vessels are stacked in multiple form in a sintering furnace. The plurality of the molded bodies are sintered in a one lump in this state at a predetermined temperature. The sintering operation is performed in such a manner that the molded body is heated to a temperature of 1800-1950° C. for 8-18 hours in a non-oxidizing atmosphere such as nitrogen atmosphere or the like.

While the sintering atmosphere may be a non-oxidizing atmosphere not reacting with AlN, the process is usually carried out in nitrogen gas atmosphere or in reducing gas atmosphere containing nitrogen gas. As the reducing gas, $H_2$ gas or CO gas may be used. The sintering process may be conducted in vacuum (containing reducing atmosphere in a small quantity), reduced-pressure, pressurized or normal pressure atmosphere.

If sintering is performed at a low temperature, for example, of under 1,800° C., it is difficult to densify or fine the structure although the degree of the difficulty depends upon the grain size of the raw material powder and the oxygen content. In this case, the characteristics, such as strength and thermal conductivity, tend to become unsatisfactory. If the sintering is performed at a temperature higher than 1,950° C., on the other hand, the vapor pressure of AlN in the sintering furnace is raised excessively, so that it becomes difficult to densify the structure. The sintering temperature should therefore be set within the foregoing range.

In this regard, the above calcinating treatment and the sintering operation can be performed in non-continuous manner (batch process) in which the respective treatments are conducted separately by using independent two sintering furnaces respectively. However, when the calcinating treatment and the sintering operation are performed in continuous manner (continuous process) in which the respective treatments are conducted continuously by using one sintering furnace commonly provided for the two treatments, a mass-productivity of the sintered body is excellent in an industrial scale or commercial scale. Therefore, the latter continuous process is more preferable.

In the above sintering operation, in order to obtain a densified sintered body and also to improve the thermal conductivity of the sintered body, an addition of the sintering agent is required to some extent. However, the sintering agent is liable to react with AlN or impurity oxygen thereby to form oxides such as $3Y_2O_3 \cdot 5Al_2O_3$ (YAG), $Y_2O_3 \cdot Al_2O_3$ (YAL) or the like, and the oxides are precipitated or deposited in the grain boundary phase. It has been confirmed that these oxides precipitated in the grain boundary phase has an adverse function of obstructing the thermal conduction in the sintered body. Accordingly, it is required to strictly control the addition amount of the sintering agent so as not to form an excessive amount of the grain boundary phase.

Particularly, as described above, for the purpose of: suppressing the maximum size (diameter) of the grain boundary phase to be formed in aluminum nitride crystal structure to 0.5 μm or less; or making the aluminum nitride crystal grain fine; or forming grain boundary phase composed of predetermined YAM or the like; or suppressing the pores of the sintered body to be fine, it is preferable that a cooling rate of the sintered body immediately after the completion of the sintering operation is controlled to be 150° C./Hr or lower and the sintered body is moderately cooled.

In a case where the above cooling rate is set to a high speed so as to exceed 150° C./Hr, the liquid phase generated in the sintered body is liable to agglomerate and segregate in the grain boundary phase, so that coarse grain boundary phase and pores are liable to be formed, and weeping of grain boundary component onto a surface of the sintered body is liable to occur. As a result, a striped pattern and a turtle-shell pattern is liable to be formed from the weeping, so that an appearance defect is liable to occur.

In particular, in a case where a furnace cooling is carried out by turning a switch to OFF of a heating power source of the sintering furnace at immediately after completion of the sintering operation, the cooling rate is about 400-500° C./Hr. In this case where the sintered body is rapidly cooled after the sintering operation, striped patterns or the like are generated due to the agglomeration and segregation of the liquid phase formed by the sintering agent, so that there are many cases where not only homogeneity or uniformity of the sintered body is impaired but also the thermal conductivity is lowered. Therefore, the sintered body after completion of the sintering operation is moderately cooled at a cooling rate of 150° C./Hr or lower to a temperature at which the liquid phase is solidified. However, a moderately cooling rate of 120° C./Hr or lower is more preferable.

The sufficiently broad temperature range in which above the cooling rate must be precisely controlled is from a predetermined sintering temperature (1800-1950° C.) to the solidifying point of the liquid phase formed by the reaction of the sintering assistant agent as described above. The liquid phase solidifying point is about 1650-1500° C. if the above mentioned sintering assistant agent is used. By controlling the cooling rate to 150° C. per hour or slower, at least in a temperature range from the sintering temperature to the solidifying point of the liquid phase, most of the fine grain boundary phases are uniformly distributed around the AlN crystal grains, thus achieving a sintered body having less amount of pores.

Each of the aluminum nitride sintered bodies manufactured in accordance with the above method has a high thermal conductivity of 220 W/m·K (at 25° C.) or greater, preferably 250 W/m·K or greater, as a poly crystalline body, and has a three point bending strength of 200 MPa or greater, preferably 240 MPa or greater, thus being excellent in mechanical characteristics.

BEST MODE FOR CARRYING OUT THE INVENTION

The aluminum nitride sintered body according to the present invention will now be described further in detail with reference to the following examples.

Examples 1 to 12

Various amounts, as shown in Table 1, of yttrium oxide as sintering assistant agents were added to an aluminum nitride material powder having an average grain size of 1.0 μm and containing 0.7 mass % of oxygen as an impurity thereby to prepare the respective mixtures. Then, each of the mixtures was wet-blended in ethyl alcohol for 30 hours and then dried to obtain the respective material powder mixtures. Subsequently, 12 weight parts of butyl methacrylate as an organic binder was added to 100 weight parts of the respective material powder mixtures, and then a ball mill mixing was sufficiently performed thereby to homogeneously mix the respective material powder mixtures.

Next, the respective material powder mixtures were dried and injected into a molding die of a press-molding machine. The injected material powder mixtures were press-molded under a molding pressure of 1200 Kg/cm² thereby to prepare a number of molded bodies (pressed compacts) of Examples 1-12. Subsequently, the respective molded bodies were subjected to a degreasing (dewaxing) treatment under the conditions shown in Table 1.

Thereafter, each of the degreased molded bodies was subjected to a deoxidizing treatment (calcinating treatment) in which the respective molded bodies were heated under the conditions of atmosphere, temperature and time, as shown in Table 1. Subsequently, each of the molded bodies was subjected to a densification sintering treatment in which the molded body was sintered in a $N_2$ gas atmosphere under the conditions shown in Table 1 so as to enhance the density of a sintered body. While the sintered bodies were subsequently cooled, each of the cooling rates until the temperature inside the furnaces was lowered to reach 1500° C. was determined as shown in Table 1 by controlling the power supplied to the heating device provided in the sintering furnace. As a result, the respective AlN sintered bodies of Examples 1 to 12 each having a size of 40 mm×40 mm×4 mm were prepared.

Examples 13 to 19

Various amounts of $Y_2O_3$ (yttrium oxides) as sintering assistant agents, as shown in Table 1, were added to the aluminum nitride material powder used in Example 1 thereby to prepare the respective mixtures. Then, each of the mixtures was subjected to a sufficient ball-mill mixing, and then dried to obtain the respective material powder mixtures. Subsequently, 12 weight parts of butyl methacrylate as an organic binder, 4 weight parts of dibutyl phthalate as plasticizer and 15 weight parts of toluene were added to 100 weight parts of the respective material powder mixtures, and then the ball mill mixing was sufficiently performed thereby to prepare the respective slurry-type material mixtures.

Then, each of the resultant material mixture slurries was controlled to have a viscosity of 15000 cps by removing solvent contained in the slurry. Thereafter, the material mixture slurries were sheet-molded in accordance with a wet-type sheet molding method (doctor blade method) to form sheet-shaped molded bodies. Subsequently, the sheet-shaped molded bodies were dried and then punched out so as to have a predetermined size, thereby to prepare a number of molded bodies (green sheets) for Examples 13 to 19. Then, the respective sheet-shaped molded bodies were subjected to the degreasing treatment under the conditions shown in Table 1.

Thereafter, each of the degreased molded bodies was subjected to a deoxidizing treatment in which the respective molded bodies were heated under the conditions of atmosphere, temperature and time, as shown in Table 1. Subsequently, each of the molded bodies was subjected to a densification sintering treatment in which the molded body was sintered in a $N_2$ gas atmosphere under the conditions shown in Table 1 so as to enhance the density of a sintered body. While the sintered bodies were subsequently cooled, each of the cooling rates until the temperature inside the furnaces was lowered to reach 1500° C. was determined as shown in Table 1 by controlling the power supplied to the heating device provided in the sintering furnace. As a result, the respective AlN sintered bodies of Examples 13 to 19 each having a size of 75 mm×75 mm×0.6 mm were prepared.

Comparative Example 1

On the other hand, preparation of the raw material, molding, degreasing (dewaxing) and sintering were performed under the same conditions as in Example 1 except that the deoxidization heat treatment was not conducted, thus preparing an AlN sintered body according to Comparative Example 1, having the same size as in Example 1.

Comparative Example 2

An AlN sintered body according to Comparative Example 2 having the same size as in Example 1 was prepared in generally the same manner as in Example 1, except that immediately after the sintering process, the heating device was powered off to cool the sintered body at a cooling rate of about 500° C./hr as performed by the conventional furnace cooling method.

Comparative Example 3

An AlN sintered body according to Comparative Example 3 having the same size as in Example 1 was prepared in the same manner as in Example 1, except that immediately after the sintering process, the cooling rate of the sintered body was set to excessively large to be 250° C./hr.

Comparative Examples 4-8

AlN sintered bodies according to Comparative Examples 4-8 having the same size as in Example 1 were prepared under the same conditions as in Example 1, except that the amount of $Y_2O_3$ was set to be excessively small (Comparative Example 4), the amounts of $Y_2O_3$ were set to be excessively large (Comparative Examples 7 to 8), the temperature of deoxidizing treatment was set to a lower temperature side lower than a preferable temperature range of the deoxidizing treatment (Comparative Example 5), and the O/Y mass ratios were set to be excessively large (Comparative Examples 5 to 6)

Comparative Example 9

As shown in Table 1, the preparation of the raw material, molding, degreasing (dewaxing) and sintering treatment were performed under the same conditions as in Example 1 except that the degreasing treatment was performed at a low temperature and the amount of the residual carbon contained in the molded body after the degreasing treatment was set to be an excessively large amount of 0.80 mass %.

As is clear from the results shown in Table 1, it is confirmed that $Y_2O_3$ contents contained in the respective sintered bodies of each Examples and Comparative Examples are slightly reduced from the addition amounts of $Y_2O_3$ added to the respective material powders.

In order to evaluate characteristics of the thus obtained AlN sintered bodies according to Examples 1 to 19 and Comparative Examples 1 to 9, each of the AlN sintered bodies was pulverized to prepare AlN powders, and each of the AlN powders was analyzed by means of X-ray diffraction (XRD) method thereby to identify a main phase and secondary phases constituting the sintered body. The main phase and secondary phases are indicated as intensity ratio of the X-ray diffraction.

Further, a photomicrograph of a fracture surface of each of the sintered bodies was taken by a scanning type electron microscope (SEM) at magnification of 3500. The minimum size, maximum size, average diameter of the AlN crystal grains, number of AlN crystal grains existing in a unit area (100 μm×100 μm) and maximum size of the grain boundary phase were measured by observing the photomicrograph. Simultaneously, whether a agglomeration of the grain boundary phases and the pores are formed or not in the AlN crystal structure was observed. Furthermore, average value of the thermal conductivity and the bending strength of the respective sintered bodies were measured. Thus, the results as shown in right column of Table 1 were obtained.

In this connection, the amount of Y element and the amount of oxygen contained in the respective sintered bodies were obtained by ICP emission spectrochemical analysis in which Y concentration and oxygen concentration in a solution of each of the respective sintered bodies were quantified. Further, the thermal conductivity was measured by a laser flash method, while the bending strength was measured as three point bending strength in accordance with a standard prescribed in JIS (Japanese Industrial Standard) R-1601.

TABLE 1

| Sample No. | | Addition Amount of $Y_2O_3$ (mass %) | Molding Method | Degreasing Treatment Atmosphere | Temp. (° C.) × Time (hr) | Residual Carbon Content (mass %) | Calcinating Treatment Atmosphere | Temp. (° C.) × Time (hr) | Sintering Temp. (° C.) × Time (hr) | Cooling Rate (° C./hr) | Content (mass %) Y | O | O/Y Mass Ratio |
|---|---|---|---|---|---|---|---|---|---|---|---|---|---|
| Example | 1 | 1.0 | Press | Nitrogen | 700 × 4 | 0.40 | Nitrogen | 1400 × 4 | 1900 × 16 | 100 | 0.7 | 0.2 | 0.30 |
| | 2 | 0.2 | Press | Nitrogen | 350 × 4 | 0.40 | Nitrogen | 1550 × 4 | 1925 × 16 | 100 | 0.1 | 0.1 | 0.43 |
| | 3 | 0.5 | Press | Nitrogen | 350 × 4 | 0.40 | Nitrogen | 1400 × 4 | 1900 × 16 | 100 | 0.3 | 0.1 | 0.32 |
| | 4 | 0.5 | Press | Nitrogen | 700 × 4 | 0.40 | Nitrogen | 1400 × 4 | 1900 × 16 | 100 | 0.3 | 0.11. | 0.32 |
| | 5 | 0.5 | Press | Nitrogen | 800 × 4 | 0.30 | Nitrogen | 1550 × 4 | 1900 × 16 | 50 | 0.3 | 0.1 | 0.32 |
| | 6 | 0.5 | Press | Nitrogen | 700 × 4 | 0.40 | Nitrogen | 1400 × 4 | 1900 × 16 | 100 | 0.3 | 0.2 | 0.33 |
| | 7 | 1.0 | Press | Nitrogen | 325 × 4 | 0.60 | Nitrogen | 1400 × 4 | 1900 × 16 | 100 | 0.70 | 0.1 | 0.31 |
| | 8 | 1.0 | Press | Nitrogen | 700 × 4 | 0.40 | Nitrogen | 1400 × 4 | 1850 × 8 | 150 | 0.7 | 0.3 | 0.41 |
| | 9 | 1.0 | Press | Nitrogen | 700 × 4 | 0.40 | Nitrogen | 1400 × 4 | 1850 × 16 | 50 | 0.7 | 0.20 | 0.29 |
| | 10 | 1.2 | Press | Nitrogen | 700 × 4 | 0.40 | Nitrogen | 1400 × 4 | 1850 × 12 | 100 | 0.9 | 0.3 | 0.31 |
| | 11 | 1.2 | Press | Nitrogen | 700 × 4 | 0.40 | Nitrogen | 1300 × 4 | 1900 × 16 | 100 | 0.8 | 0.3 | 0.30 |
| | 12 | 2.0 | Press | Nitrogen | 700 × 4 | 0.40 | Nitrogen | 1400 × 6 | 1850 × 16 | 100 | 1.4 | 0.5 | 0.32 |
| | 13 | 0.5 | Sheet | Nitrogen | 700 × 4 | 0.50 | Nitrogen | 1400 × 4 | 1900 × 16 | 100 | 0.3 | 0.1 | 0.32 |
| | 14 | 0.9 | Sheet | Nitrogen | 700 × 4 | 0.50 | Nitrogen | 1400 × 4 | 1900 × 16 | 50 | 0.6 | 0.2 | 0.31 |
| | 15 | 0.9 | Sheet | Nitrogen | 700 × 4 | 0.50 | Nitrogen | 1400 × 4 | 1875 × 16 | 100 | 0.6 | 0.2 | 0.34 |
| | 16 | 0.9 | Sheet | Nitrogen | 700 × 4 | 0.50 | Nitrogen | 1400 × 4 | 1850 × 16 | 100 | 0.6 | 0.2 | 0.37 |
| | 17 | 0.9 | Sheet | Nitrogen | 700 × 4 | 0.50 | Nitrogen | 1400 × 4 | 1850 × 10 | 100 | 0.6 | 0.2 | 0.38 |
| | 18 | 0.9 | Sheet | Nitrogen | 700 × 4 | 0.50 | Nitrogen | 1400 × 4 | 1820 × 8 | 100 | 0.7 | 0.3 | 0.40 |
| | 19 | 0.9 | Sheet | Nitrogen | 700 × 4 | 0.50 | Nitrogen | 1400 × 4 | 1900 × 16 | 200 | 0.60 | 0.3 | 0.42 |
| Comparative Example | 1 | 1.0 | Press | Nitrogen | 700 × 4 | 0.40 | — | — | 1900 × 16 | 100 | Non-Sintered, YN generated | | |
| | 2 | 1.0 | Press | Nitrogen | 700 × 4 | 0.40 | Nitrogen | 1400 × 4 | 1900 × 16 | 500 | 0.7 | 0.4 | 0.50 |
| | 3 | 1.0 | Press | Nitrogen | 700 × 4 | 0.40 | Nitrogen | 1400 × 4 | 1900 × 16 | 250 | 0.7 | 0.4 | 0.49 |
| | 4 | 0.1 | Press | Nitrogen | 700 × 4 | 0.40 | Nitrogen | 1400 × 4 | 1950 × 16 | 150 | 0.1 | 0 | 0.43 |
| | 5 | 1.0 | Press | Nitrogen | 700 × 4 | 0.40 | Nitrogen | 1100 × 4 | 1850 × 16 | 150 | 0.7 | 0.4 | 0.53 |
| | 6 | 1.0 | Press | Nitrogen | 500 × 4 | 0.05 | Nitrogen | 1400 × 4 | 1850 × 16 | 150 | 0.76 | 0.5 | 0.71 |
| | 7 | 5.0 | Press | Nitrogen | 500 × 4 | 0.05 | Nitrogen | 1400 × 4 | 1820 × 8 | 100 | 3.80 | 1.9 | 0.50 |
| | 8 | 5.0 | Press | Nitrogen | 700 × 4 | 0.40 | — | — | 1850 × 16 | 100 | Non-Sintered, YN generated | | |
| | 9 | 1.0 | Press | Nitrogen | 300 × 4 | 0.80 | Nitrogen | 1400 × 4 | 1900 × 16 | 100 | Non-Sintered, YN generated | | |

| Sample No. | | X-ray Diffraction (X) Intensity Ratio ($I_{Al_2Y_4O_9}/I_{AlN}$) | ($I_{Y_2O_3}/I_{AlN}$) | Other Secondary Phase | AlN Crystal Grain Size (μm) Ave. | Min. | Max. | Number of Crystal Grain per $100^2$ μm$^2$ | Grain Size of Grain Boundary Phase (μm) | Thermal Conductivity (W/m·K) | Three Point Bending Strength (MPa) | Remarks |
|---|---|---|---|---|---|---|---|---|---|---|---|---|
| Example | 1 | 0.005 | 0.028 | — | 12 | 4 | 18 | 75 | 0.1 | 259 | 235 | |
| | 2 | 0.002 | — | — | 11 | 6 | 20 | 85 | 0.05 | 225 | 250 | |
| | 3 | 0.005 | 0.013 | — | 11 | 3 | 18 | 70 | 0.1 | 245 | 260 | |
| | 4 | 0.005 | 0.012 | — | 11 | 3 | 18 | 70 | 0.1 | 250 | 250 | |
| | 5 | 0.004 | 0.014 | — | 12 | 3 | 20 | 65 | 0.1 | 248 | 230 | |
| | 6 | 0.004 | 0.010 | — | 10 | 3 | 15 | 80 | 0.1 | 240 | 270 | |
| | 7 | 0.004 | 0.026 | — | 12 | 5 | 20 | 70 | 0.1 | 245 | 260 | |
| | 8 | 0.019 | — | — | 9 | 3 | 15 | 135 | 0.1 | 225 | 300 | |
| | 9 | 0.005 | 0.029 | — | 10 | 3 | 18 | 85 | 0.2 | 250 | 280 | |
| | 10 | 0.006 | 0.029 | — | 6 | 3 | 12 | 185 | 0.1 | 240 | 315 | |
| | 11 | 0.006 | 0.030 | — | 12 | 4 | 18 | 75 | 0.1 | 245 | 280 | |
| | 12 | 0.009 | 0.050 | — | 10 | 3 | 15 | 80 | 0.1 | 230 | 270 | |
| | 13 | 0.011 | 0.014 | — | 11 | 4 | 20 | 80 | 0.1 | 250 | 230 | |
| | 14 | 0.020 | 0.026 | — | 12 | 5 | 20 | 60 | 0.1 | 258 | 220 | |
| | 15 | 0.023 | 0.023 | — | 10 | 4 | 18 | 90 | 0.1 | 250 | 230 | |
| | 16 | 0.026 | 0.020 | — | 9 | 3 | 16 | 120 | 0.1 | 240 | 240 | |
| | 17 | 0.010 | 0.002 | — | 7 | 2.5 | 14 | 170 | 0.1 | 230 | 300 | |
| | 18 | 0.012 | — | — | 4 | 2 | 8 | 200 | 0.1 | 220 | 340 | |
| | 19 | 0.013 | — | — | 11 | 4 | 18 | 75 | 0.2 | 220 | 250 | |

TABLE 1-continued

| | | | | | | | | | | | |
|---|---|---|---|---|---|---|---|---|---|---|---|
| Comparative Example | 1 | | | | Non-Sintered, YN generated | | | | | | |
| | 2 | 0.009 | — | YAL | 11 | 4 | 20 | 80 | 1 | 210 | 180 | Generation of Striped Pattern |
| | 3 | 0.010 | — | YAL | 12 | 4 | 18 | 75 | 0.8 | 215 | 200 | Generation of Striped Pattern |
| | 4 | 0.001 | — | — | 14 | 5 | 25 | 60 | 0.05 | 215 | 230 | |
| | 5 | — | — | YAL | 8 | 3 | 15 | 140 | 0.2 | 210 | 300 | |
| | 6 | — | — | YAG | 8 | 3 | 15 | 145 | 0.2 | 170 | 300 | |
| | 7 | — | — | YAG, YAL | 5 | 1.5 | 9 | 300 | 0.6 | 195 | 300 | |
| | 8 | | | | Non-Sintered, YN generated | | | | | | |
| | 9 | | | | Non-Sintered, YN generated | | | | | | |

(※) X-ray diffraction intensity ratio of $Al_2Y_4O_9$ (YAM) is expressed as a ratio of count of 201 plane with respect to count of 101 plane of AlN.
X-ray diffraction intensity ratio of $Y_2O_3$ is expressed as a ratio of count of 222 plane with respect to count of 101 plane of AlN.
As other secondary phases, YAL denotes $YAlO_3$, while YAG denotes $Y_3Al_5O_{12}$.

As is clear from the results shown in Table 1, in the aluminum nitride (AlN) sintered bodies according to Examples 1 to 18, the cooling rate of the sintered bodies immediately after the completion of the densification sintering operation were set to a level lower than those of Comparative Examples 2 to 3 and the conventional cooling rates, agglomeration or segregation of the liquid phase was small in the crystal structure, and any agglomeration of pores was not observed at all. In addition, when the structures of the respective sintered bodies were observed by means of a microscope, the maximum size of the grain boundary phase was small to be less than 0.2 μm and the maximum size of the pore was fine to be less than 0.5 μm in any of the crystal structures.

Further, since there was formed the crystal structure in which fine grain boundary phases were uniformly distributed and the grain boundary phase was formed of the secondary phase mainly composed of $Al_2Y_4O_9$, there could be obtained a sintered body having a high density (high strength), a high thermal conductivity and an excellent heat radiating property.

Furthermore, in case of the aluminum nitride sintered body of Example 19 manufactured by setting the cooling rate of the sintered body immediately after the completion of the densification sintering operation to 200° C./hr, the number of the crystal grains existing in a unit area of the sintered body structure was decreased, and the maximum size of the grain boundary phase was increased, so that the thermal conductivity and the strength characteristics of the sintered body were disadvantageously lowered.

On the other hand, in case of the AlN sintered bodies according to Comparative Examples 1 and 8 to which the deoxidizing treatment (calcinating treatment) was not subjected, since the residual carbon effectively acting as the deoxidizing agent was not bond to oxygen and the oxygen was not evaporated or removed, the added $Y_2O_3$ was reduced by carbon and nitrided to generate YN, or the carbon was remained as it was, so that the densification of the sintered body was inhibited. As a result, the molded body was not sufficiently sintered and remained in a non-sintered state.

Further, in the samples of Comparative Examples 2 and 3 in which the cooling rates of the sintered bodies were set to large and the sintered bodies were rapidly cooled, the coarse grain boundary phase was formed so as to have the maximum grain size of 0.8-1.0 μm. In addition, a large-sized pore having the maximum size of 2 μm was observed in all over the structure of the sintered body, and defective striped-shaped patterns were generated on the surface of the sintered body. Thus, both the strength and the thermal conductivity of the resultant sintered body were disadvantageously lowered.

Furthermore, in the sample of Comparative Example 4 to which the $Y_2O_3$ was added in an excessively small quantity, X-ray diffraction intensity ratio ($I_{Al_2Y_4O_9}/I_{AlN}$) of the sintered body also became excessively small, so that a sufficient thermal conductivity was not obtained.

On the other hand, in case of Comparative Example 5 in which the temperature of deoxidizing treatment was set to a lower temperature side lower than a preferable temperature range of the deoxidizing treatment, the mass ratio (O/Y) became excessively large and the secondary phase composed of YAL having a large heat resistance was formed, so that the thermal conductivity was not sufficient.

Further, in case of AlN sintered body of Comparative Example 6 in which the O/Y mass ratio was set to be excessively large, the crystal structure was formed to be fine, so that a bending strength characteristic was improved. However, since the secondary phase composed of YAG having a large heat resistance was formed, the thermal conductivity was lowered.

Furthermore, in case of Comparative Example 7 in which the addition amount of $Y_2O_3$ was set to be excessively large, the crystal structure was formed to be fine, so that the bending strength characteristic was improved. However, since the secondary phases composed of YAG and YAL each having a large heat resistance were formed, the thermal conductivity was lowered. On the other hand, in case of Comparative Example 9 in which the degreasing treatment was performed at a low temperature and the amount of the residual carbon contained in the molded body after the degreasing treatment was set to be an excessively large amount of 0.80 mass %, it was difficult to densify the AlN molded body, a sintering was impossible, so that the resultant body was in non-sintered state. In addition, the added $Y_2O_3$ was reduced by carbon and nitrided to generate YN in the sintered body structure, and the carbon was remained as it was, so that the densification of the sintered body was inhibited.

INDUSTRIAL APPLICABILITY

According to the aluminum nitride sintered body of the present invention, as described above, the addition amount of Y element as a sintering agent is suppressed to a minimum amount of 0.2-2 mass % in terms of Y oxide which is the amount required for densifying the sintered body. Further, in order to remove oxygen acting as a factor for inhibiting thermal conductivity, a deoxidizing heat treatment is performed prior to the densification sintering operation, and the grain boundary phases formed after the sintering operation are limited to two phases each having a small heat resistance: i.e. a phase composed of $2Y_2O_3 \cdot Al_2O_3$ (YAM); and a phase composed of $2Y_2O_3 \cdot Al_2O_3$ (YAM) and $Y_2O_3$. As a result, the amount of impurity oxygen contained in the sintered body is decreased to 0.5% or less, the aluminum nitride sintered body having a thermal conductivity of 220 W/m·K or higher can be obtained with a high mass-productivity.

Furthermore, in the manufacturing used in the present invention, unlike the conventional process in which sintered body is cooled rather quickly by the furnace cooling method, when the cooling rate of the sintered body immediately after the completion of the sintering operation is set to 150° C./hr or lower, the amount of agglomeration or segregation of the liquid phase generated at the sintering operation is small, so that a crystal structure in which fine grain boundary phases are uniformly distributed can be obtained. In addition, pores to be formed in the crystal structure can be made fine, simultaneously the number of the pores can be decreased. Therefore, the thermal conduction or the densification is not inhibited by the coarse grain boundary phase or the pores, so that there can be obtained an aluminum nitride sintered body having a high strength and thermal conductivity.

What is claimed is:

1. A substrate comprising a high thermal conductive aluminum nitride sintered body having:
    a thermal conductivity of 220 W/m·K or more; and
    a three point bending strength of 250 MPa or more;
    wherein a ratio ($I_{Al_2Y_4O_9}/I_{AlN}$) of X-ray diffraction intensity ($I_{Al_2Y_4O_9}$) of $Al_2Y_4O_9$ (201 plane) with respect to X-ray diffraction intensity ($I_{AlN}$) of aluminum nitride (101 plane) is 0.002 to 0.03, and
        said aluminum nitride sintered body comprises 0.14-1.5 mass % of Y element and 0.05-0.5 mass % of oxygen,
        a mass ratio (O/Y) of oxygen (O) with respect to Y element is 0.5 or less,
        an average diameter of aluminum nitride crystal grains is 4 µm or more,
        a number of crystal grains existing in arbitrary crystal structure area of 100 µm×100 µm is 200 or less, and
        a maximum diameter of grain boundary phase is 0.5 µm or less.

2. The substrate according to claim 1, wherein
    a ratio ($I_{Y_2O_3}/I_{AlN}$) of X-ray diffraction intensity ($I_{Y_2O_3}$) of $Y_2O_3$ (222 plane) with respect to X-ray diffraction intensity ($I_{AlN}$) of AlN (101 plane) is 0.002 to 0.06.

3. A substrate comprising a high thermal conductive aluminum nitride sintered body having:
    a thermal conductivity of 200 W/m·K or more; and
    a three point bending strength of 250 MPa or more;
    wherein
        a ratio ($I_{Al_2Y_4O_9}/I_{AlN}$) of X-ray diffraction intensity ($I_{Al_2Y_4O_9}$) of $Al_2Y_4O_9$ (201 plane) with respect to X-ray diffraction intensity ($I_{AlN}$) of AlN (101 plane) is 0.002 to 0.06, and
        a ratio ($I_{Y_2O_3}/I_{AlN}$) of X-ray diffraction intensity ($I_{Y_2O_3}$) of $Y_2O_3$ (222 plane) with respect to X-ray diffraction intensity ($I_{AlN}$) of AlN (101 plane) is 0.008 to 0.06, and
        said aluminum nitride sintered body comprises 0.14-1.5 mass % of Y element and 0.05-0.5 mass % of oxygen,
        a mass ratio (O/Y) of oxygen (O) with respect to Y element is 0.6 or less,
        an average diameter of aluminum nitride crystal grains is 4 µm or more,
        a number of crystal grains existing in arbitrary crystal structure area of 100 µm×100 µm is 150 or less, and
        a maximum diameter of grain boundary phase is 0.5 µm or less.

4. The substrate according to claim 1, wherein
    a minimum diameter of the aluminum nitride crystal grains is 2 µm or more, and a maximum diameter of the aluminum crystal grains is 20 µm or less.

5. The substrate according to claim 1, wherein
    a minimum diameter of the aluminum nitride crystal grains is 4 µm or more, and a maximum diameter of the aluminum crystal grains is 25 µm or less.

6. The substrate according to claim 1, wherein a grain boundary phase to be a secondary phase is limited to a phase comprising $2Y_2O_3 \cdot Al_2O_3$.

7. The substrate according to claim 1, wherein a grain boundary phase to be a secondary phase is limited to a phase consisting essentially of $2Y_2O_3 \cdot Al_2O_3$.

8. The substrate according to claim 1, wherein a grain boundary phase to be a secondary phase is limited to a phase consisting of $2Y_2O_3 \cdot Al_2O_3$.

9. The substrate according to claim 3, wherein a grain boundary phase to be a secondary phase is limited to a phase comprising $2Y_2O_3 \cdot Al_2O_3$.

10. The substrate according to claim 3, wherein a grain boundary phase to be a secondary phase is limited to a phase consisting essentially of $2Y_2O_3 \cdot Al_2O_3$.

11. The substrate according to claim 3, wherein a grain boundary phase to be a secondary phase is limited to a phase consisting of $2Y_2O_3 \cdot Al_2O_3$.

12. The substrate according to claim 3, wherein a grain boundary phase to be a secondary phase is limited to a phase comprising $2Y_2O_3 \cdot Al_2O_3$.

13. The substrate according to claim 3, wherein a grain boundary phase to be a secondary phase is limited to a phase comprising $Y_2O_3$.

14. The substrate according to claim 3, wherein a grain boundary phase to be a secondary phase is limited to a phase comprising $2Y_2O_3 \cdot Al_2O_3$ and $Y_2O_3$.

15. The substrate according to claim 3, wherein a grain boundary phase to be a secondary phase is limited to a phase consisting essentially of $2Y_2O_3 \cdot Al_2O_3$ and $Y_2O_3$.

16. The substrate according to claim 3, wherein a grain boundary phase to be a secondary phase is limited to a phase consisting of $2Y_2O_3 \cdot Al_2O_3$ and $Y_2O_3$.

17. A semiconductor apparatus comprising the substrate according to claim 1.

18. A semiconductor apparatus comprising the substrate according to claim 3.

* * * * *